Patented Feb. 6, 1951

2,540,775

UNITED STATES PATENT OFFICE 2,540,775

TREATMENT OF PHTHALOCYANINE PIGMENTS

Robert E. Brouillard, Bound Brook, and Vito A. Giambalvo, Somerville, N. J., assignors to American Cyanamid Company, New York, N. Y., a corporation of Maine No Drawing. Application July 24, 1948, Serial No. 40,627

17 Claims. (Cl. 260—314.5)

This invention relates to a new process for treating tetrabenzo-tetrazaporphine pigments, commonly known as phthalocyanines. More particularly, the invention relates to a method of transforming finely divided amorphous phthalocyanine pigments into micro-crystalline pigments which show a high resistance to flocculation.

The phthalocyanine pigments have many important technical advantages and are outstanding in many of their pigmentary properties. However, when the pigments are used under conditions which permit flocculation, particularly when used in coating compositions, a serious disadvantage arises.

The drying of coating compositions containing phthalocyanine pigments often results in a lack of uniformity of dispersion of the pigment present. This lack of dispersion appears to be caused by flocculation of the pigment particles and a dry film is often characterized by a non-uniform, mottled effect. This affects adversely the gloss, smoothness, and color value of the coating.

Coating compositions containing nitrocellulose exert a particularly undesirable effect on ordinary phthalocyanine pigments. When a uniform dispersion of copper phthalocyanine is prepared in a typical coating composition containing nitrocellulose, the pigment can be observed to coalesce into loose clusters within a short time and non-uniform and mottled effects are especially troublesome in coating compositions of this type. Unfortunately, many of the important coating compositions of commerce include nitrocellulose so that the difficulties due to flocculation represent a serious practical problem.

Not only is there a tendency for the pigment particles to flocculate and give non-uniform results, but the degree of flocculation of the same coating composition is not constant with different methods of application. For example, when the coating composition is sprayed on to an object, the flocculation is much less than when the object is dipped in the same coating composition. In the latter case, the pigment appears weaker tinctorially and duller in shade. Unfortunately, in a number of practical applications, some parts of an object may be sprayed and others dipped. In such a case, the coloring does not match and coating compositions containing flocculating phthalocyanine pigments are often unsuitable for such uses.

In referring to the term "flocculation," we are dealing with the gross results. It is known that the pigment particles do coalesce or flocculate.

Just why they behave in this manner has not been fully determined. However, the degree of flocculation can be accurately measured by various means, some of which are described in U. S. Patent No. 2,327,472. A very satisfactory method of quantitative measurement of the degree of flocculation is by means of a recording spectrophotometer. For example, glass holders may be coated, one by spraying and the other by dipping. The holders should be designed to eliminate specular reflection as is described in U. S. Patent No. 2,364,825. The measurement of the strength of color by the spectrophotometer will then give a numerical measure of the degree of flocculation, or rather the loss in color value resulting from flocculation. Tests of a typical nitrocellulose lacquer formulation using flocculating copper phthalocyanine as the pigment may show 30–35% weaker color for the poured sample than the sprayed sample. In the spraying, of course, there is probably re-dispersion of the flocculated or coalesced pigment particles.

In the past, many attempts have been made to solve the problem of flocculation of phthalocyanine pigments. Some of these proposals involve coating the pigment with an agent such as, for example, aluminum benzoate. This method suffers from the serious disadvantage that the resulting product contains a smaller amount of color because of the rather large amounts of the added material and the added material may in some cases be reactive and adversely affect the properties of the finished coating composition.

It has also been proposed to add certain dispersing agents during the conditioning of the pigment prior to incorporation into coating composition. This method also suffers from the disadvantage that foreign matter is permanently incorporated with the pigment and the solution is, therefore, not completely satisfactory practically.

So serious has the flocculation problem been in the past that in many cases it has been avoided by using some derivatives of phthalocyanines which do not flocculate. This method of solution, however, closes the field to the use of the ordinary phthalocyanine pigments and is not an adequate solution of the problem.

The present invention depends on the action of hydrocarbons and halogenated hydrocarbons on amorphous phthalocyanine pigments. It has long been known that many amorphous phthalocyanine pigments, when subjected to the action of many organic liquids, such as aromatic hydrocarbons, tend to form large crystals. This has always been considered a serious drawback because liquids of this type are often present as vehicles in coating compositions for which phthalocyanine pigments have been particularly useful. As a result the utility of phthalocyanine pigments in coating compositions was reduced because the formation of the large crystals resulted in very serious loss of color value and also in many cases produced an objectionable bronzing effect.

According to the present invention, we have found that when amorphous phthalocyanine pigments in an aqueous dispersion having a pH greater than 4 are subjected to hydrocarbons or halogenated hydrocarbon liquids for a short time, the amorphous particles form minute crystals and if then the solvent is removed by any suitable means, such as for example by steam stripping, a product is obtained which shows substantially the same color value as amorphous phthalocyanine pigments but does not tend to flocculate.

The microcrystals produced by the present invention are so minute that they can often not be identified by ordinary microscopical examination. The definite crystalline nature of these minute particles is, however, shown when they are examined under suitable magnification in an electron microscope or the crystallized lattice structure examined by X-ray diffraction. While the present invention is not limited to an exact size of the microcrystals, they are in general needle-like crystals having an average length not exceeding 0.5 micron.

Not only has it become possible by the present invention to produce a microcrystalline product of high tinctorial value by a relatively short exposure to organic liquids which are known to destroy the utility of phthalocyanine on storage, but these microcrystalline pigments exhibit not only a high resistance to flocculation but they are also much more resistant to the action of crystallizing organic liquids than are amorphous phthalocyanine pigments and, therefore, they can be used in coating compositions where the higher stability is sufficient to prevent serious loss in color strength on storage for moderate periods.

The products obtainable by the process of the present invention have a further advantage over non-crystallizing phthalocyanine pigments which have been made in the past by processes which are described and claimed in the copending applications of Wiswall, Serial No. 1,924, dated January 13, 1948, and Loukomsky, Serial No. 718,884, dated December 27, 1946, now Patent No. 2,486,304. These products which show an almost perfect stability against crystalline growth in contact with crystallizing organic liquids even under extreme conditions, are of a strongly greenish-blue shade. While for many purposes this shade is desirable, there are also many fields in which a redder-blue is needed and it is an important additional advantage of the products obtainable by the process of the present invention that they have the same reddish shade which is characteristic of the common phthalocyanine pigments. These shade differences are of greatest importance in connection with the phthalocyanine pigment which is used most commonly, namely copper phthalocyanine.

It is not known just why it is possible to obtain microcrystals by a relatively short exposure to certain organic liquids which then exhibit not only high resistance to flocculation but also a markedly increased resistance to further crystallization. Therefore, the invention is not limited to any particular theory of why this surprising increase in stability in the micro-crystals results.

The liquids which may be used in the present invention are all immiscible with water at ordinary temperature. Their action requires temperatures ranging from room temperature to slightly above in order to permit short treating periods. This imposes a practical lower limit to the boiling point of the liquid used. In general, they should have the boiling point of at least 50° C. Liquids of much higher boiling points are quite suitable. However, practical considerations set an upper limit on the boiling point of the liquids because of the necessity of removing them which can be effected by steam stripping or vacuum distillation. Accordingly, the liquids should not have a boiling point materially above 250° C. and should have vapor pressure curves sufficiently flat so that they are volatile with steam.

While the hydrocarbons and halogenated hydrocarbons are all usable, they vary among themselves in the speed with which they bring about the formation of microcrystals. Good results are obtainable with such liquids as benzene, toluene, xylene, cyclohexane, mono- and dichlorobenzene, hexane, heptane, trichloroethylene and carbon tetrachloride. It is an advantage of the invention that the liquids do not have to be of high chemical purity. Ordinary technical grades may be employed which reduces the cost of the treatment substantially. It is also unnecessary to use single chemical compounds and mixtures of several liquids give about the same results. This further reduces the cost as many of the hydrocarbons are obtained much more cheaply as a mixture of homologues.

The quantity of the liquid used, while not critical, should fall within a broad range dictated by practical operating conditions. In general there must be sufficient organic liquid so that a complete transfer of the amorphous pigment from the aqueous slurry to the organic phase results. This amount will vary somewhat with different liquids but in general will be from about 5 to 10 parts per part of pigment. Larger amounts may be used but do not improve the results and hence are undesirable because they increase the cost of operation.

The aqueous slurry of amorphous phthalocyanine pigment, which is treated in the present invention by the organic liquid, should not be strongly acid and should, therefore, have a pH above 4. In general, the slurry is produced by acid pasting in which the phthalocyanine pigment is dissolved partially or wholly in concentrated sulfuric acid and is precipitated in the form of finely divided amorphous particles by drowning in water or pouring on ice. The acidity may be neutralized or partly neutralized and, as pointed out above, the pH range is fairly broad so that this step does not require critical control.

It is not possible to give an exact time and temperature for the exposure of the slurry of the pigment to the organic liquid because this will vary with different liquids. As in the formation of large crystals, temperature and time are both factors. In the present invention, the time and temperature will vary somewhat for each liquid and an optimum range is easily determined by observing the transformation of the amorphous particles into the microcrystalline needle crystals. In order to save time of treatment it is generally desirable to operate at temperature slightly above room temperatures, although the invention is not limited thereto and can proceed at lower temperatures but in such cases excessive time is required and the cost of treatment increases. Higher temperatures may also be used but of course for shorter periods of time. The higher temperatures are advantageous in shortening the time cycles but make control for the production of a product for maximum quality more difficult. With many of the liquids used a sharp temperature regulation can be obtained by distilling for a water-organic liquid azeotrope.

The invention will be described in greater detail in connection with the following specific examples which are intended to be illustrative only. All parts are by weight.

Example 1

25 parts of copper phthalocyanine was dusted into 350 parts of concentrated sulfuric acid at 50–55° C. with stirring. The mixture was stirred at 50–55° C. for one hour and 50 parts of xylene was added. Stirring was continued until sulfonation of the xylene was substantially complete. The pigment solution was then drowned into a mixture of 1000 parts of flaked ice and 1500 parts of water.

The aqueous pigment slurry which formed was filtered and the cake washed acid-free. The cake was then washed with a dilute alkaline solution and with water until alkali-free.

The aqueous pigment press cake was slurried in sufficient water to give a slurry containing 10% solids. 200 parts of toluene was then introduced and the mixtures stirred at 25–30° C. until the pigment had been completely transferred from the aqueous to the non-aqueous phase and for four hours longer. The toluene was then removed by introducing steam into the mixture.

When substantially free of toluene the aqueous pigment slurry was filtered and the cake dried at 60–65° C.

When the pigment prepared as described above was formulated into a lacquer as described in U. S. Patent No. 2,327,472, it showed substantially no flocculation, was of excellent color intensity and its shade was reddish-blue.

Example 2

25 parts of copper phthalocyanine was acid pasted as described in Example 1.

The aqueous pigment press cake was added to 150 parts of benzene at 25–30° C. The mixture was stirred until the pigment was completely transferred from the aqueous to the non-aqueous phase, and then for four hours longer. The benzene was then removed by introducing steam into the mixture.

When substantially free of benzene, the aqueous pigment slurry was filtered and the cake dried at 60–65° C.

The product thus obtained exhibited properties similar to those of the product of Example 1.

Example 3

25 parts of copper phthalocyanine was acid pasted as described in Example 1.

The aqueous pigment press cake was added to 200 parts of carbon tetrachloride at 25–30° C. The mixture was stirred until the pigment was completely transferred from the aqueous to the non-aqueous phase and for four hours additional time. The carbon tetrachloride was then removed by introducing steam into the mixture.

When substantially free of carbon tetrachloride, the aqueous pigment slurry was filtered and the cake dried at 60–65° C.

The product thus obtained exhibited properties similar to those of the product obtained in Example 1.

Example 4

25 parts of copper phthalocyanine was acid pasted as described in Example 1.

The aqueous pigment press cake was added to 150 parts of mixed hexanes at 25–30° C. The mixture was stirred until the pigment was completely transferred from the aqueous to the non-aqueous phase.

The pigment was isolated as described in Example 3 and exhibited properties similar to those of the product of Example 1.

Example 5

25 parts of copper phthalocyanine was dusted into 350 parts of concentrated sulfuric acid at 50–55° C. with stirring. The mixture was stirred at 50–55° C. for one hour and drowned into 1000 parts of ice and 1500 parts of water.

The pigment was isolated and treated as described in Example 1 and showed similar pigmentary properties.

Example 6

25 parts of metal-free phthalocyanine was dusted into 350 parts of concentrated sulfuric acid at 0–5° C. The mixture was stirred at 0–5° C. for one hour and drowned into 1000 parts of ice and 1500 parts of water.

The aqueous pigment slurry which resulted was filtered and the cake washed acid-free. The cake was then washed with a dilute alkaline solution and with water until alkali-free.

The aqueous pigment press cake was slurried in sufficient water to give a slurry containing 10% solids. 200 parts of carbon tetrachloride was introduced and the mixture stirred until the pigment had been completely transferred from the aqueous to the non-aqueous phase and for four hours longer. The carbon tetrachloride was then removed by introducing steam into the mixture.

When substantially free of carbon tetrachloride, the aqueous slurry was filtered and the cake dried at 60–65° C.

When the pigment prepared as described above was formulated into a lacquer as described in U. S. Patent No. 2,327,472, it showed substantially no flocculation, was of excellent color intensity and its shade was greenish-blue.

Example 7

25 parts of nickel phthalocyanine was dusted into 350 parts of concentrated sulfuric acid at 50–55° C. The mixture was stirred for one hour at 50–55° C. and 50 parts of xylene was added. Stirring was continued until sulfonation of the xylene was complete. The pigment solution was then drowned into a mixture of 1000 parts of flaked ice and 1500 parts of water.

The aqueous pigment slurry which resulted was filtered and the cake washed acid-free. The cake was then washed with a dilute alkaline solution and with water until alkali-free.

The aqueous pigment press cake was slurried in sufficient water to give a slurry containing 10% solids. 200 parts of carbon tetrachloride was introduced and the mixture stirred until the pigment had been completely transferred from the aqueous to the non-aqueous phase and for four hours longer. The carbon tetrachloride was then removed by introducing steam into the mixture.

When substantially free of carbon tetrachloride the aqueous slurry was filtered and the cake dried at 60–65° C.

When the pigment prepared as described above was formulated into a lacquer as described in U. S. Patent No. 2,327,472, it showed substantially no flocculation, was of excellent color intensity and its shade was blue.

*Example 8*

25 parts of a mixture of copper phthalocyanine and monochloro copper phthalocyanine containing approximately the same amount of each was dusted into 350 parts of concentrated sulfuric acid at 50–55° C. The mixture was stirred for one hour at 50–55° C. and 50 parts of xylene was added. Stirring was continued until sulfonation of the xylene was complete. The pigment solution was then drowned into a mixture of 1000 parts of flaked ice and 1500 parts of water.

The aqueous pigment slurry which resulted was filtered and the cake washed acid-free. The cake was then washed with a dilute alkaline solution and with water until alkali-free.

The aqueous pigment press cake was slurried in sufficient water to give a slurry containing 10% solids. 200 parts of carbon tetrachloride was introduced and the mixture stirred until the pigment had been completely transferred from the aqueous to the non-aqueous phase and for four hours longer. The carbon tetrachloride was then removed by introducing steam into the mixture.

When substantially free of carbon tetrachloride, the aqueous slurry was filtered and the cake dried at 60–65° C.

When the pigment prepared as described above was formulated into a lacquer as described in U. S. Patent No. 2,327,472, it showed substantially no flocculation, was of excellent color intensity and the shade was comparable to the product of Example 1.

We claim:

1. In the manufacture of improved microcrystalline phthalocyanine pigments having high resistance to flocculation from amorphous phthalocyanine pigments, the improved process which comprises admixing an aqueous dispersion of finely divided amorphous phthalocyanine pigment with a water immiscible organic liquid selected from the group consisting of hydrocarbons and halogenated hydrocarbons having boiling points between 50° C. and 250° C., agitating the mixture until the pigment is transferred from the aqueous to the non-aqueous phase of said mixture and the amorphous pigment is converted into needle-like microcrystals of less than 0.5 micron average length, and removing the organic liquid from said mixture to obtain an aqueous dispersion of said microcrystalline phthalocyanine pigment.

2. The process of claim 1 wherein the microcyrstalline phthalocyanine pigment so obtained is separated from the said aqueous dispersion thereof and dried to obtain a dry, finely divided microcrystalline phthalocyanine pigment having high resistance to flocculation.

3. The process of claim 1 wherein said organic liquid is carbon tetrachloride.

4. The process of claim 1 wherein said organic liquid is benzene.

5. The process of claim 1 wherein said organic liquid is toluene.

6. The process of claim 1 wherein the said removal of the organic liquid is effected by introducing steam into said aqueous mixture and distilling off the organic liquid therefrom.

7. The process of claim 1 wherein said phthalocyanine pigment is copper phthalocyanine.

8. In the manufacture of improved microcrystalline copper phthalocyanine pigments having high resistance to flocculation from amorhous copper phthalocyanine pigments the improved process which comprises admixing an aqueous dispersion of finely divided, amorphous copper phthalocyanine pigment with a water immiscible organic liquid selected from the group consisting of hydrocarbons and halogenated hydrocarbons having boiling points between 50° C. and 250° C., agitating the mixture until the pigment is transferred from the aqueous to the non-aqueous phase of said mixture, continuing the agitation until the amorphous copper phthalocyanine pigment is converted into needle-like microcrystals of less than 0.5 micron average length, and removing the organic liquid from said mixture to obtain an aqueous dispersion of said microcrystalline copper phthalocyanine pigment.

9. The process of claim 8 wherein said aqueous dispersion of finely divided amorphous copper phthalocyanine pigment is prepared by sulfuric acid pasting of copper phthalocyanine in the presence of xylenesulfonic acid followed by drowning in water.

10. The process of claim 8 wherein the aqueous dispersion of microcrystalline copper phthalocyanine pigment so obtained is filtered to separate the said pigment and the filter cake is dried at temperatures between 60° C. and 65° C. to obtain a dry, finely divided microcrystalline copper phthalocyanine pigment having high resistance to flocculation.

11. The process of claim 8 wherein said organic liquid is carbon tetrachloride.

12. The process of claim 8 wherein said organic liquid is benzene.

13. The process of claim 8 wherein said organic liquid is toluene.

14. In the manufacture of improved microcrystalline phthalocyanine pigments having high resistance to flocculation from amorphous phthalocyanine pigments, the improved process which comprises admixing an aqueous dispersion of finely divided amorphous phthalocyanine pigment with a water immiscible organic liquid selected from the group consisting of hydrocarbons and halogenated hydrocarbons having boiling points between 50° C. and 250° C., agitating the mixture until the pigment is transferred from the aqueous to the non-aqueous phase of said mixture, continuing the agitation until the amorphous pigment is converted into needle-like microcrystals of less than 0.5 micron average length, removing the organic liquid from said mixture to obtain an aqueous dispersion of said microcrystalline phthalocyanine pigment, and separating the microcrystalline phthalocyanine pigment from said aqueous dispersion, the finely divided, microcrystalline phthalocyanine pigment so obtained having high resistance to flocculation.

15. The process of claim 14 wherein the organic liquid is removed from said aqueous mixture by steam stripping the same.

16. The process of claim 14 wherein the said improved microcrystalline phthalocyanine pigment is separated from said aqueous dispersion by filtering the same and drying the wet pigment so obtained to remove the residual water, the dry, finely divided, microcrystalline phthalocyanine pigment so obtained having high resistance to flocculation.

17. The process of claim 14 wherein said phthalocyanine pigment is copper phthalocyanine.

ROBERT E. BROUILLARD.
VITO A. GIAMBALVO.

REFERENCES CITED

The following references are of record in the file of this patent:

UNITED STATES PATENTS

| Number | Name | Date |
|---|---|---|
| 2,192,954 | Sloan et al. | Mar. 12, 1940 |
| 2,268,144 | Vesce | Dec. 30, 1941 |